June 20, 1944.   H. KÜPPENBENDER   2,351,978
PHOTOGRAPHIC CAMERA
Filed March 15, 1941
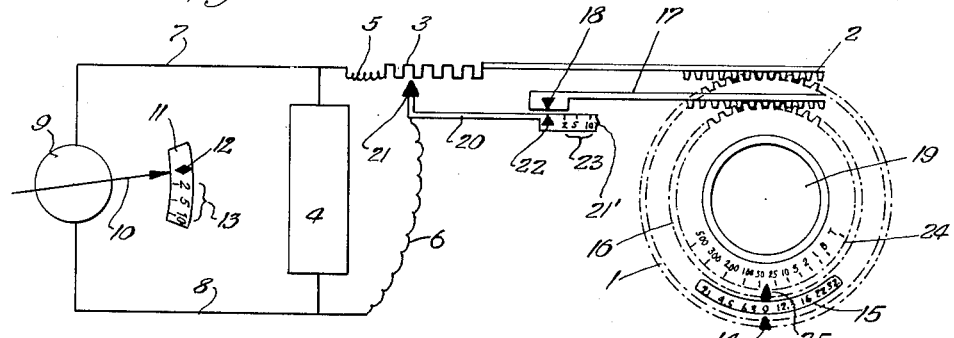
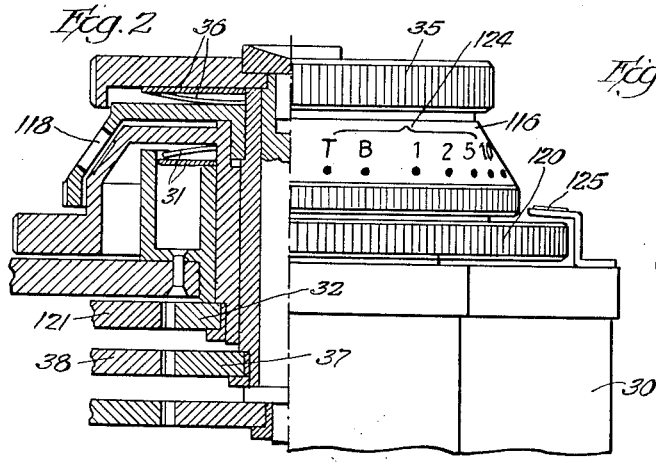
Inventor
Heinz Küppenbender Patented June 20, 1944

2,351,978

UNITED STATES PATENT OFFICE 2,351,978

PHOTOGRAPHIC CAMERA

Heinz Küppenbender, Dresden, Germany; vested in the Alien Property Custodian

Application March 15, 1941, Serial No. 383,535
In Germany January 25, 1940

5 Claims. (Cl. 95—10)

This invention relates to improvements in photographic cameras.

It is an object of the invention to facilitate the adjustment of exposure control members in accordance with the prevailing light conditions.

Another object of the invention is to provide a camera in which this adjustment of exposure control members can be effected with greater accuracy than heretofore, and under light conditions which up to now had not been considered favorable for ordinary exposures.

Another object of the invention is to provide a photographic camera in which errors in computation of exposure control are eliminated to a very great extent even under those light conditions which heretofore made it necessary for the operator to compute certain values to effect the adjustment of the exposure control.

Another object of the invention is to provide a camera in which the necessity of making mental calculations on the part of the operator is entirely eliminated, and particularly in which those errors which heretofore arose from failure to readjust a camera after one exposure are dispensed with.

At the present, there is a great tendency on the part of the manufacturers to produce photographic still cameras and motion picture cameras with the exposure meter attached thereto. These exposure meters usually are photoelectric meters and are combined with an instrument having a pointer whose position is to be observed by the operator in order to adjust the exposure control members. The use of exposure meters has become of greater importance in the use of color film, since the color film is not quite as tolerant as to deviations from the best exposure conditions as the ordinary black and white film.

In the following specification, reference is made to photographic cameras, and this term is understood to include still cameras as well as motion picture cameras.

The exposure control members referred to are not only the shutter which can be set to variable speeds, as demanded by the objects or the light conditions, the diaphragm also settable in accordance with the focal depth required, and the light conditions, but these exposure control members also take into consideration the sensitiveness or speed of the film, the provision of light filters calling for a length of exposure different from that for an unprotected lens, etc. These exposure control members, or some of them, had previously been associated with the photoelectric exposure meter by connecting them fixedly, each with a resistance in the circuit of the photoelectric exposure meter, and this resistance could either be common to all of the exposure control members, or each exposure control member was associated fixedly with a separate resistance.

Now, it is well known that under adverse light conditions, the indicator of the instrument forming part of the exposure meter did not move to that mark on its dial which determined the proper adjustment of the exposure control members. The dial, therefore, had been provided with additional values, and the operator had to multiply either the exposure length, that is, the shutter speed, with these values to which the indicator had been moved, or had to take this deviation of the indicator from normal deflection into consideration when calculating the adjustment of other exposure control members.

Any additional adjustment of the exposure control members or of one of them then obviously had the reciprocal result of again varying the resistance values in the circuit of the electric exposure meter with the effect that the indicator of the latter moved again to a different position. In order to overcome this movement of the indicator to a new position, cameras had been built in which for the purpose of adjusting an exposure control member in accordance with an abnormal position of the indicator, the control member to be adjusted was disconnected from the resistance in the circuit. Obviously the control member could then be adjusted without moving the indicator.

In the next operation of the camera, under different light conditions, it was then necessary for the operator to reconnect the respective control member with its resistance. This led to errors inasmuch as the operator forgot to establish this connection again, or when establishing, did not do it in the proper way. While, therefore, the exposure for which the adjustment had been carried out properly was a correct exposure, the next following exposures might easily be faulty, and the error, therefore, continued for a series of exposures until the operator noticed the disconnection between the exposure member and the pertaining resistance. The operation of a camera of this character, therefore, demanded considerable skill, and attention on the part of the operator, and as modern cameras in the hands of amateurs are operated frequently in rapid succession, the provision of a releasable coupling between exposure control members and resistances was unsatisfactory.

Cameras are also described in which this coupling was restored automatically by the very exposure for which it had been interrupted. But arrangements of this kind called for mechanical details which were involved and costly.

The provision of numeral values on the dial of the exposure meter alongside of that mark which indicated the correct position, also compelled the operator to see to it that the indicator or pointer stopped on one of these additional numeral values. An accurate adjustment, therefore, was not provided, but only an adjustment in certain given intervals. These intervals then called for the mental calculation, usually a multiplication of the exposure time, as indicated with the value at which the pointer of the exposure meter had come to rest.

The present invention relates to a photographic or motion picture camera in which the photoelectric exposure meter forms a permanent part of the equipment. The exposure control members are each fixedly connected with a resistance, or the resistance in the photoelectric circuit with the exception of one of these exposure control members. This exposure control member which is not fixedly coupled with the resistance in the circuit of the exposure meter is settable in accordance with an element, the position of which is determined by the conditions in the circuit of the photoelectric exposure meter. When this exposure control member which is not fixedly coupled with the circuit is set, it obviously does not alter the conditions in the circuit, and hence, the pointer of the instrument forming part of the photoelectric exposure meter retains that position to which it has been moved owing to the photoelectric energization of the exposure meter. There is, therefore, no mental calculation required on the part of the operator. He merely observes the position of a certain part of the exposure control and then sets that exposure control member which is not fixedly connected with the circuit, as determined by said position. It, therefore, suffices to provide the element adjustable in accordance with the circuit conditions with a mark or index and to set the exposure control member which also has an index until a predetermined relation exists between the two indices, as for instance, an opposition of the two marks.

The invention, therefore, accomplishes the object of greatly simplifying the operation of this type of still or motion picture cameras, and with these and numerous other objects in view, embodiments of the invention are described in the following specification, wherein reference is made to the accompanying drawing.

In the drawing:

Fig. 1 is a diagrammatic illustration of the principal parts in their relation to each other in a photographic camera;

Fig. 2 is partly a section and partly an elevation of an exposure control assembly as used for miniature cameras.

Fig. 3 is a fragmentary top plan view on parts shown in Fig. 2;

Fig. 4 is a fragmentary side elevation of parts illustrated in Fig. 2;

Fig. 5 shows partly in side elevation and partly in section, similar to Fig. 2, an embodiment of the invention, as applied to the exposure control, namely, film speed of a motion picture camera.

Fig. 1 diagrammatically illustrates an arrangement in which an exposure control member, namely, the diaphragm, is fixedly coupled with the resistance of the photoelectric circuit, while a second exposure control member, namely, the shutter speed control, is releasably coupled thereto. In this diagrammatic showing, the diaphragm ring 1 may be imagined to have gear teeth on a portion of its circumference in order to influence by its rotary adjustment a rack bar 2, which is in fixed connection with a resistance 3. This resistance forms part of an electric circuit having as source of energy the photoelectric cell 4 and the conductors 5 and 6 which may be flexible conductors. The photoelectric exposure meter also is located in a circuit shunted to the circuit just described and comprising, in addition, to the connectors 7 and 8, the galvanometer 9, the indicator 10 of which is adapted to swing over a dial 11. The proper adjustment of the exposure control members of the camera is indicated when the pointer 10 stands in opposition to a mark 12 of the dial 11. This dial, however, is provided with additional marks 13, which may be more or less close to the position of the pointer 10 when the latter, owing to adverse light conditions, cannot be swung far enough to be in opposition to the standard or normal mark 12 on the dial.

The position to which the diaphragm 1 is adjusted, may be determined by the operator from the relation of a mark 14 on the ring 1 with respect to a dial 15 which may be in a fixed place.

A second exposure control member may be constituted by the shutter speed adjustment. In the diagrammatic showing of Fig. 1, the shutter is set to the correct speed by means of a rotatable ring 16, also in engagement with a rack bar 17 which is suitably guided for rectilinear movement. This rack bar 17, however, is not fixedly connected with any part of the photoelectric circuit of the exposure meter. It carries at its end an index 18, and it is the relation of this index or mark 18 to another mark on a carrier which is connected with the photoelectric exposure circuit that will determine the proper adjustment of the shutter speed control member 16. In the diagrammatic showing of Fig. 1, the exposure control members 1 and 16 are shown in concentric relation to a diagrammatically indicated lens 19 of the camera.

The mark 18 fixedly associated with the second exposure control member 16 is to be set in accordance with the position of a mark on an element 20, which terminates in a slide contact 21 cooperating with the circuit, and particularly with the resistance 3 of the circuit for varying the resistance conditions in the circuit formed by the elements 4, 5, 3 and 6.

When, upon energization of the exposure meter, the pointer 10 thereof swings to the end of the scale, the operator adjusts one or both of the exposure control members 1 and 16 until the pointer has returned to the normal index 12 on the dial 11. If the light conditions are such that upon adjustment of the exposure control members, this return of the pointer 10 cannot be effected, or if the conditions predominating for this particular exposure are such that an adjustment of either exposure control member to the value at which this return would take place cannot be carried out, the pointer obviously will come to rest at one of the marks 13 of the dial, the final position of the pointer depending upon the conditions for the exposure.

Normally, the intermediate element 17 and the intermediate element 20 between the exposure control member 16 and the slide contact 21 are coupled with each other, so that upon movement of the exposure control member, the slide contact 21 also is moved correspondingly. The intermediate element 20 terminates in a carrier 21' for an index or mark 22, with which additional marks 23 are associated. Under normal conditions, the marks 18 and 22 are in opposition to each other. When it is noticed, however, that the galvanometer pointer 10 moves to one of the marks 13 only on the dial, the operator will shift the exposure control member 16 alone without at the same time shifting the intermediate element 20, and will move the mark 18 associated with the exposure control member 16 to that additional mark of the group of marks 23 which corresponds to the group of marks 13 on the dial 11 of the galvanometer. In this manner, the shutter speed is set to the proper value without resetting any member of the circuit of the exposure meter, and the exposure can be made with the setting thus obtained.

While in the embodiment illustrated in Fig. 1, the releasable coupling is shown interposed between the shutter speed control member 16 and the circuit element 21, it is obvious that this releasable coupling might also be interposed between the stop control member 1 and the resistance 3. The essential feature of the invention is that one of the exposure control members have a releasable coupling between it and the exposure circuit.

The proper adjustment of the shutter speed setting member 16 may be determined by the relation of the dial 24 to a mark 25, the two latter being movable relatively to each other.

Figs. 2 to 4 illustrate an embodiment of a portion of this exposure control, as applied to a modern miniature camera. The camera casing is indicated at 30 and supports preferably on the top and adjacent one end wall thereof, a shutter speed setting ring 116, which is equipped with a shutter speed dial 124, whereby the adjustment to any desired speed may be ascertained from the relation of the dial 124 to a stationary mark 125 on the camera. This shutter speed setting element 116 is connected by a friction clutch or some other releasable coupling assembly 31 with a rotary ring 120, the two members 116 and 120 being rotatable about the same axis. The element 120 carries a pinion 32 whereby its rotation is transmitted to an element 121 which may be connected in some manner to the circuit of the photoelectric exposure meter, and which may for the present purposes, therefore, symbolize said circuit. It is obvious that upon rotation of the ring 120, an alteration will thus be introduced into the condition of this circuit.

As long as the coupling 31 between the two elements 116 and 120 of this exposure control is operative, the rotary adjustment of the ring 116 will induce some alteration in the circuit of the photoelectric exposure meter. But when, in spite of this alteration, the pointer will not return to the normal mark indicated at 12 in Fig. 1, an adjustment of the element 116 may be made, whereby a mark on said element enters into a relation with a mark on the second element 120 similar to the relation between the pointer 10 and the location on the dial 11 on which it has stopped.

For this purpose, the element 120 of this exposure control assembly is provided with additional markings 123 shown in dotted lines in Fig. 4, and with a normal marking 122. The other element 116 of the exposure control assembly is provided with a cut out or window 118. It is, therefore, feasible to set the exposure control element 116 to bring its perforation or window 118 into register either with the mark 122 or with any of the marks in the group 123. No mental calculation is required any more to alter the setting of this exposure control assembly in accordance with the showing of the galvanometer pointer 10. The operator merely has to glance at the circumference of the ring 116 to see whether it has been adjusted to proper position, and to restore the ring 116 to show registration of the marks 118 and 122 when the pointer 10 has been moved through the energization of the cell 4 into opposition to the mark 12. Also, if the pointer 10 should have come to a stop between two marks of the group 13 on dial 11, it is a very easy operation to also bring the perforation mark 118 on the element 116 into a corresponding relation with respect to the marks in the group 123 of the element 120.

In this manner, the exposure control elements for the shutter are brought into proper position, as determined by the photoelectric exposure meter.

In Figs. 2 to 4, there is also shown in coaxial relation with respect to the exposure control assembly 116, 120, a shutter tensioning ring 35 which may be adjusted together with the exposure control element 116 when a friction coupling 36 is in operative condition, or which may be operated independently to complete the tensioning of the shutter upon release of this coupling 36. A gear 37 adjacent the lower end of a shaft with which the shutter tensioning element 35 is connected, may transmit its movement through a transmission member 38 to the tensioning device for the shutter, not shown.

In this embodiment, therefore, proper relation between the indications of the exposure meter and the adjustment to be effected on an exposure control member, namely, the shutter, is accomplished in a manner which lends itself particularly to practical application on miniature cameras. In the embodiment of Fig. 5, the invention is applied to the exposure control of a motion picture camera. The shutter speed control, in this instance determining the frequency of pictures per time unit, comprises the rotary knob 216 and an additional rotary element 220, which last named element, upon rotation, varies the conditions in the circuit of the photoelectric exposure meter. These two elements, however, are not fixedly connected with each other.

The housing 40 of the motion picture camera supports these two elements 216 and 220 by means of a stem 41. The two elements 216 and 220 are normally coupled for conjoint operation by the releasable clutch 42. The clutch also connects the shutter speed setting ring 216 to an element 43 for transmitting the movement of this adjusting element to the feed mechanism of the motion picture camera. The companion setting element 220 for this exposure control transmits its movement through the gear 202 to a member which will effect an adjustment of the circuit for the photoelectric exposure meter and which in Fig. 5 is represented by a gear 44. If, therefore, through the conjoint rotation of the elements 216, 220, the pointer of the galvanometer on the exposure meter cannot be moved to registration with the normal mark shown in Fig. 1 at 12, and if the pointer should come to a stop at any of the additional marks of the group 13, upon release of the clutch between the members 216 and 220, a corresponding adjustment of the knob 216 alone may be effected and may be transmitted through the part 43 to the feed mechanism. The previously effected adjustment of the photoelectric circuit is not interfered with since upon release of the coupling between the two elements 216 and 220, no further adjustment of the element 220 is effected.

A carrier 45 for a mark 218 again is attached to the element 216, and the mark 218, therefore, could be brought to a predetermined relation with a corresponding mark on the companion element 220.

In the present embodiment, however, there is also provided an additional exposure control element 50 in the form of a ring adjustable about the common axis of the elements 216 and 220. This ring carries the companion marks 222 and also may carry the additional marks represented in Fig. 1 at 23 and in Fig. 4 at 123, but which are not illustrated in Fig. 5. This additional exposure control element 50 may be adjusted with respect to the element 220 depending, for instance, upon the sensitivity or speed of the film. A pin 51 is shown to be inserted into the adjusting ring 220, and may enter one out of a plurality of sockets 52 in the additional adjustment ring 50. It is obvious that upon setting the additional ring 50 to different relations with respect to the companion setting element 220, the adjustment of the exposure control element 216 with respect to the companion element 220 will deviate from any previous adjustment. Hence, by setting the additional ring 50 in accordance with the speed of the film in relation to the element 220 and then adjusting the exposure control element 216 in accordance with the indications provided by the galvanometer, a plurality of exposure control factors may be properly taken into consideration in a very simple manipulation of the entire device.

In this embodiment also, the carrier 45 has its indicator mark 218 provided in the form of a cut out portion or window which upon rotation of the adjusting ring 216 may be moved over the normal mark 222 on the additional adjusting ring 50 or over any of the other marks which may be provided on said ring in correspondence with the group 13 of the marks on the galvanometer dial.

In both of the embodiments illustrated in Figs. 2 to 5, it is again the shutter control which is provided with the flexible and releasable coupling permitting the adjustment of the shutter control independently of the adjustment of the resistance. It is obvious, however, that this flexible or releasable coupling may be combined with any of the other exposure control members, as for instance, with the diaphragm adjustment.

In these embodiments, furthermore, the marks are provided at a place remote from the lens of the camera, not shown. But it is obvious that with the application of the shutter speed control in concentric arrangement to the lens or with the diaphragm control in concentric arrangement to the lens, the marks to be read also may be provided adjacent the lens mounting. Even where exchangeable lenses are provided on a camera of this character, this alteration from the embodiments illustrated in Figs. 2 to 5 may be resorted to.

I claim:

1. In a camera, the combination of a photoelectric exposure meter, a lens systems, a shutter, a variable lens diaphragm, a shutter speed adjusting member, a lens diaphragm adjusting member, a variable resistance in the circuit of said photoelectric exposure meter, a measuring instrument in said circuit provided with a pointer, an exposure time multiplier scale over which said pointer moves, movable means operatively connected to one of said adjusting members for varying said resistance on the actuation of the adjusting member to which said movable means are connected, second movable means operatively connected to the second adjusting member for varying said resistance on the actuation of the second adjusting member, said second movable means comprising a pair of movable elements one of which is operatively connected to said second adjusting means, releasable coupling means connecting said elements together, said elements when coupled being moved together to effect variation in said resistance on actuation of said second adjusting member, the element connected to said second adjusting member being relatively movable with respect to the second element on actuation of said second adjusting member when said coupling means are released, scale means substantially similar to the scale associated with said pointer carried by one of said elements and indicating means cooperating with said scale means carried by the other of said elements whereby said indicating means may be located in a position relative to said scale means which corresponds to the position of said pointer with respect to its cooperating scale on actuation of the second adjusting member when the said elements are in uncoupled condition.

2. In a camera, the combination of a photoelectric exposure meter, a lens system, a shutter, a variable lens diaphragm, a shutter speed adjusting member, a lens diaphragm adjusting member, a variable resistance in the circuit of said photoelectric exposure meter, a measuring instrument in said circuit provided with a pointer, an exposure time multiplier scale over which said pointer moves, means connected to the shutter speed adjusting member and separate means connected to the diaphragm adjusting member to vary said resistance on adjustment of either of said adjusting members, one of said connecting means having releasable coupling means whereby its corresponding adjusting member may be uncoupled from its connecting means and operated without causing variation of said resistance and the adjusting means having the releasable coupling means being provided with an indicating mark and a time exposure scale which are relatively movable with respect to each other on actuation of said just mentioned adjusting means with its coupling means in released condition, said just mentioned scale being substantially similar to the scale over which said pointer is movable.

3. In a camera, the combination of a photoelectric exposure meter, a lens system, a shutter, a variable lens diaphragm, a shutter speed adjusting member, a lens diaphragm adjusting member, a measuring instrument in said circuit provided with a pointer, an exposure time multiplier scale over which said pointer moves, a movable member, means connecting said movable member to one of said adjusting members whereby to cause its movement on the actuation of the adjusting member, resistance means in said circuit, said resistance means being movable in accordance with the movement of said movable member, a pair of movably mounted elements one of which carries contact means slidable over said resistance means, second connecting means connecting the second element to the second adjusting means, said contact means being connected in said circuit, coupling means releasably securing said elements together whereby said elements may be moved relative to each other without causing a variation in said resistance when said coupling means is released, and scale means substantially similar to the scale associated with said pointer carried by one of said elements and indicating means cooperating with said scale means carried by the other of said elements whereby said indicating means may be located in a position relative to said scale means which corresponds to the position of said pointer with respect to its cooperating scale on actuation of the second adjusting member when the said elements are in uncoupled condition.

4. In a camera, the combination of a photoelectric exposure meter, a lens system, a shutter, a variable lens diaphragm, a shutter speed adjusting member, a lens diaphragm adjusting member, a variable resistance in the circuit of said photoelectric exposure meter, a measuring instrument in said circuit provided with a pointer, an exposure time multiplier scale over which said pointer moves, means connected to the shutter speed adjusting member and separate means connected to the diaphragm adjusting member to vary said resistance on adjustment of either of said adjusting members, one of said connecting means having releasable coupling means whereby its corresponding adjusting member may be uncoupled from its connecting means and operated without causing variation of said resistance, one of said adjusting members and the means cooperating therewith for varying said resistance comprising a pair of coaxially arranged rotatable elements, and means for clutching said elements, one of said rotatable elements being provided with scale means substantially similar to the scale associated with said pointer and the other rotatable element being provided with indicating means cooperating with said scale means whereby said indicating means may be located in a position relative to said scale means which corresponds to the position of said pointer with respect to its cooperating scale when the rotatable elements are unclutched and the driving rotatable element is rotated.

5. In a camera, the combination of a photoelectric exposure meter, a lens system, a shutter, a variable lens diaphragm, a shutter speed adjusting member, a lens diaphragm adjusting member, a variable resistance in the circuit of said photoelectric exposure meter, a measuring instrument in said circuit provided with a pointer, an exposure time multiplier scale over which said pointer moves, means connected to the shutter speed adjusting member and separate means connected to the diaphragm adjusting member to vary said resistance on adjustment of either of said adjusting members, one of said connecting means having releasable coupling means whereby its corresponding adjusting member may be uncoupled from its connecting means and operated without causing variation of said resistance, one of said adjusting members and the means associated therewith for varying said resistance comprising a driving rotatable element and a driven rotatable element coaxially arranged with respect to each other, clutch means for releasably securing said rotatable elements together, a third rotatable element coaxially arranged with respect to said first named rotatable elements and located between them, said third rotatable element being movable relative to the other rotatable elements, means for securing said third rotatable element in an adjusted position to said driven element, and scale means and indicating means associated with said driven element and said third rotatable element, said scale means being substantially similar to the scale cooperating with said pointer whereby said indicating means may be located in a position relative to said scale means which corresponds to the position of said pointer with respect to its cooperating scale when the driven element is rotated in an unclutched condition.

HEINZ KÜPPENBENDER.